United States Patent [19]

Ghoneim

[11] Patent Number: 5,305,218
[45] Date of Patent: Apr. 19, 1994

[54] VEHICLE HANDLING CONTROL FOR WHEEL SLIP CONTROL SYSTEMS

[75] Inventor: Youssef A. Ghoneim, Mt. Clemens, Mich.

[73] Assignee: General Motors Corporation, Detroit, Mich.

[21] Appl. No.: 970,422

[22] Filed: Nov. 2, 1992

Related U.S. Application Data

[63] Continuation-in-part of Ser. No. 720,071, Jun. 24, 1991, Pat. No. 5,258,912.

[51] Int. Cl.⁵ .............................................. B60T 8/58
[52] U.S. Cl. ......................... 364/426.02; 364/424.05; 303/102; 180/197
[58] Field of Search ........... 364/426.01, 426.02, 364/426.03, 424.05; 180/97, 140–142; 303/95, 96, 100, 106, 110, 111, 102

[56] References Cited

U.S. PATENT DOCUMENTS

| | | | |
|---|---|---|---|
| 2,798,565 | 7/1957 | Rosenthal et al. | 180/6.5 |
| 3,190,387 | 6/1965 | Dow | 180/65 |
| 3,288,232 | 11/1966 | Shepherd | 180/1 |
| 3,362,493 | 1/1968 | Davis et al. | 180/6.32 |
| 3,368,425 | 2/1968 | Lewis | 74/720.5 |
| 3,592,280 | 7/1971 | Wappler et al. | |
| 3,756,335 | 9/1973 | Eisele et al. | 180/6.28 |
| 3,870,935 | 3/1975 | Abels et al. | 318/52 |
| 4,313,166 | 1/1982 | Rode et al. | 364/426.02 |
| 4,571,010 | 2/1986 | Dittner et al. | 303/110 |
| 4,589,511 | 5/1986 | Leiber | 180/197 |
| 4,807,943 | 2/1989 | Ogino | 303/113 |
| 4,809,181 | 2/1989 | Ito et al. | 364/426.01 |
| 4,946,015 | 8/1990 | Browalski et al. | 192/1.23 |
| 4,949,823 | 8/1990 | Coutant et al. | 192/4 C |
| 4,998,593 | 3/1991 | Karnopp et al. | 364/426.02 |
| 5,103,925 | 4/1992 | Imaseki et al. | 364/424.05 |
| 5,206,808 | 4/1993 | Inoue et al. | 364/424.05 |

*Primary Examiner*—Gary Chin
*Attorney, Agent, or Firm*—Howard N. Conkey

[57] ABSTRACT

A wheel slip control system for the left and right wheels common to an axle of a vehicle establishes a desired turning radius by controlling the wheel slip limit so as to establish the outer to inner wheel speed ratio $\omega_o/\omega_i$ to a desired value $(R_d+d)/(R_d-d)$ where Rd is the desired turning radius and 2d is the distance between the wheels. The desired steering radius is based upon the operator steering input and a desired understeer value.

5 Claims, 5 Drawing Sheets

VEHICLE HANDLING CONTROL FOR WHEEL SLIP CONTROL SYSTEMS

This is a continuation-in-part of Ser. No. 07/720,071 filed on Jun. 24, 1991, now U.S. Pat. No. 5,258,912, the contents of which are hereby incorporated by reference.

This invention pertains to vehicle handling control during anti-lock controlled braking and/or acceleration traction control and more particularly to control of wheel slip for anti-lock controlled braking and/or acceleration traction control to provide for improved performance and maintain desired vehicle understeer characteristics during vehicle turning.

BACKGROUND OF THE INVENTION

During anti-lock controlled braking and acceleration traction control operating modes of a vehicle, it is desirable to maintain a close correspondence between steering wheel angle and vehicle steering. However, depending upon the characteristics of the vehicle, the vehicle may tend to have an increased understeer, so the operator must turn the steering wheel more to get the vehicle to properly turn. The vehicle may also oversteer, requiring the operator to turn the steering wheel less for the vehicle to properly turn. When steering a vehicle, the speed of the driven or braked wheels of the vehicle can effect vehicle steering performance to deviate from its preset understeer characteristics.

When a vehicle turns, the wheels closest to the center of the turning radius are referred to as the inner wheels and the wheels farthest from the center of the turning radius are referred to as the outer wheels. Referring to FIG. 1, a vehicle 12 has four wheels 14, 16, 18, and 20, a wheel base L, and each wheel has a distance D from the centerline 21 of the vehicle 12. The vehicle is shown with the front wheels 16 and 20 turned so that the vehicle makes a right turn such that the center of gravity 22 of the vehicle 12 turns at a radius R around the center 24 of the turn. In this example, the wheels 18 and 20 are inside wheels and the wheels 14 and 16 are the outside wheels. When the vehicle turns left, wheels 14 and 16 are the inside wheels and the wheels 18 and 20 are the outside wheels.

An operator negotiates a turn which has a desired turning radius of $R_d$ by rotating the vehicle steering wheel. However, if vehicle understeer characteristics (note: "understeer characteristics" may infer both understeer and oversteer depending upon the sign) deviate from the vehicle's nominal setting, the actual turning radius of the vehicle, R, varies from the desired turning radius, $R_d$. Vehicle understeer occurs when the steering wheel is turned a specific amount, indicating a desired steering radius $R_d$, but the actual steering radius, R, is greater than $R_d$. Vehicle understeer is characterized by an understeer coefficient $K_u$, which is a function of the static normal load on the front and rear tires and the cornering stiffness of the tires. An understeer coefficient $K_u$ greater than zero occurs during vehicle understeer, and is considered stable, however, it is not desirable to have a very large understeer coefficient.

Vehicle oversteering occurs when the steering wheel is turned to a specific amount, indicating a desired steering radius $R_d$, but the actual steering radius, R, is less than $R_d$. This occurs when the understeer coefficient $K_u$ is less than zero.

Because the cornering stiffness of a given tire varies with a number of operational parameters including inflation pressure, normal load, braking effort, and lateral force, the understeer coefficient $K_u$ varies with the operating conditions of the vehicle. Therefore, it is important to maintain the effective understeer coefficient within a certain desired level, $0 \leq K_u \leq K_d$, to provide stable and consistent vehicle behavior, allowing the driver to direct the vehicle without excessive steering.

It is further known that while turning, the lateral force on a vehicle wheel can be increased to enhance directional control by decreasing wheel slip to levels below the slip resulting in a maximum longitudinal force.

SUMMARY OF THE INVENTION

This invention provides a wheel slip control system for the left and right wheels common to an axle of a vehicle to achieve the desired turning radius by controlling the outer to inner wheel speed ratio $\omega_o/\omega_i$ to a desired value of $(R_d+d)/(R_d-d)$ while at the same time enhancing directional control of the vehicle during the turn. The desired steering radius, $R_d$, is calculated to allow an acceptable amount of understeer, maintaining the vehicle understeer coefficient substantially at a desired value $K_{ud}$.

This invention may be implemented on vehicle anti-lock brake control systems or on acceleration slip control systems having brake pressure modulators at each of the left and right wheels of an axle for independently regulating the wheel slips. The anti-lock or acceleration slip control target slip values are controlled so as to control the wheel speed ratio during anti-lock controlled braking or acceleration slip control to maintain the vehicle on a reference path in response to a steering input by the vehicle operator while at the same time enhancing directional control of the vehicle.

In accordance with one aspect of the invention, when applied to a traction control system, the slip limit value of the inside wheel during a turn is adjusted via brake pressure control from the wheel slip value resulting in maximum longitudinal force to effect a decrease in the wheel speed relative to the speed of the wheel on the outside of the turn to establish the desired turning radius $R_d$. The adjustment of the slip limit is in direction reducing the inside wheel slip magnitude thereby increasing the wheel lateral force. When applied to an anti-lock brake control system, the desired turning radius $R_d$ is established by decreasing the slip limit of the outside wheel during a turn from the slip value resulting in maximum longitudinal force to effect an increase in the wheel speed relative to the speed of the wheel on the inside of the turn. This slip decrease further provides the benefit of increasing wheel lateral force.

DESCRIPTION OF A PREFERRED EMBODIMENT

Figure 1:
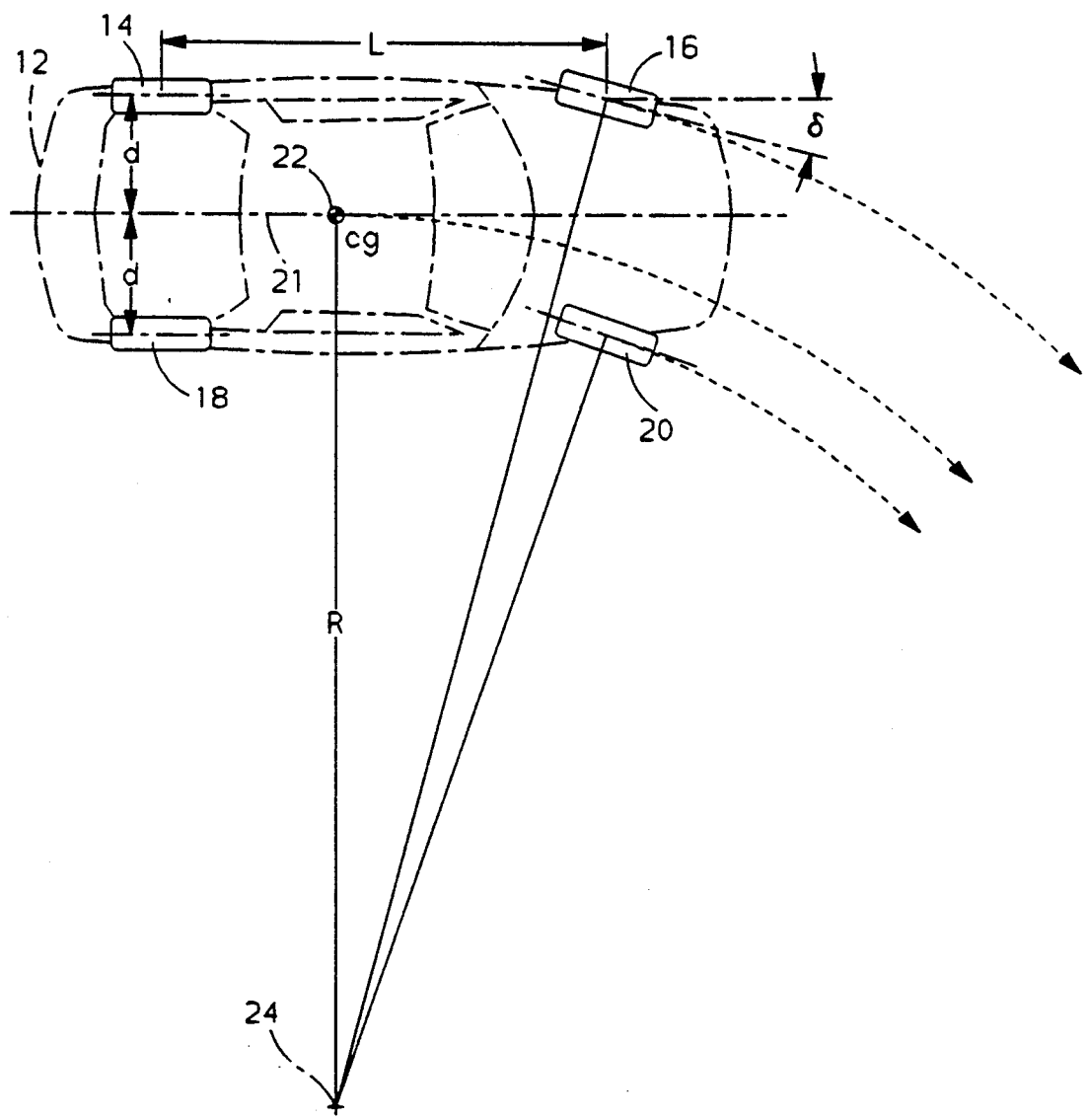
FIG. 1 is a schematic illustration of a vehicle steered to turn.
Figure 2:
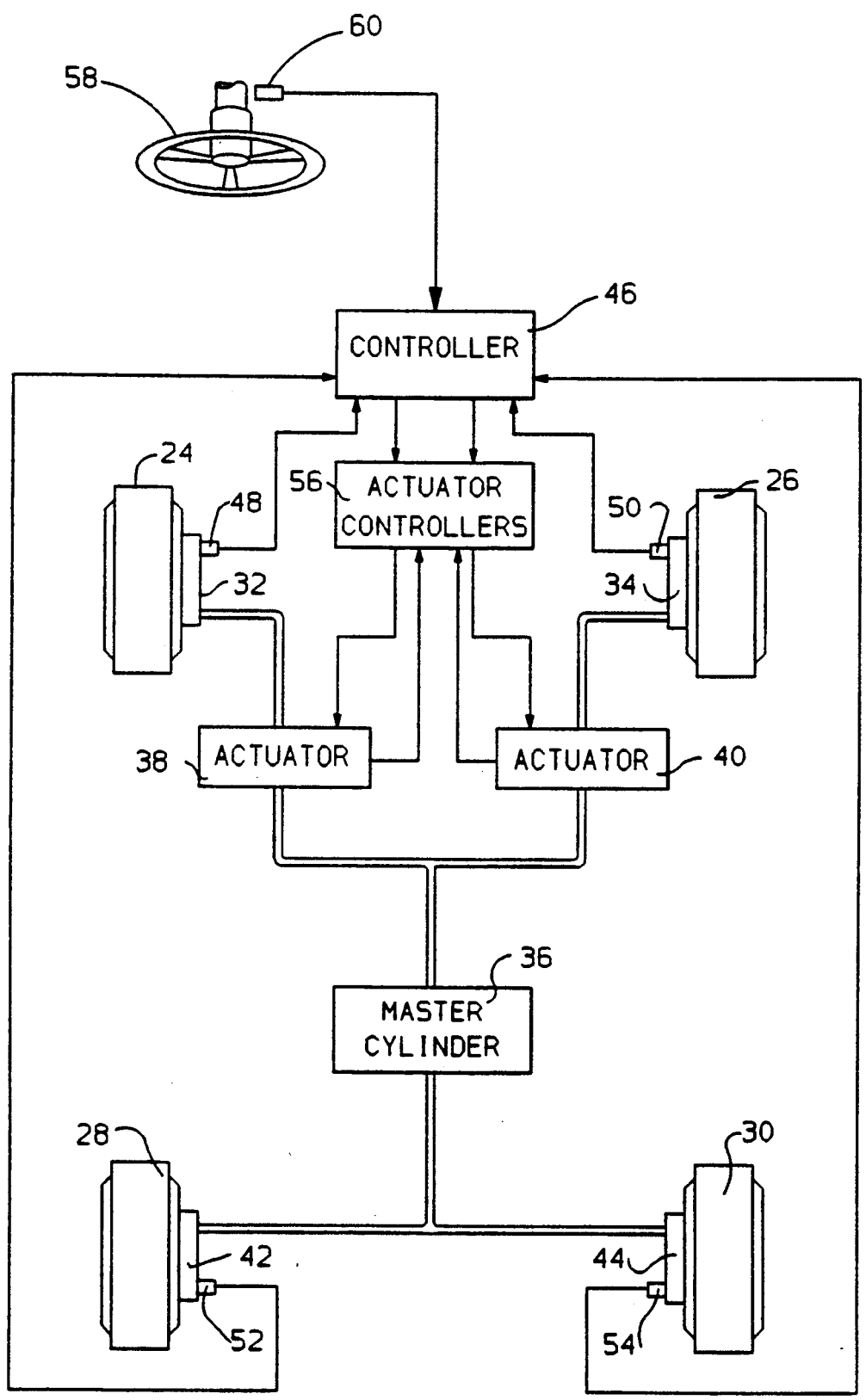
FIG. 2 is a schematic block diagram of a vehicle traction control system.

A traction control system for a front wheel drive vehicle is illustrated in FIG. 2. The vehicle has left and right front driven wheels 24 and 26 and left and right rear non-driven wheels 28 and 30. The front wheels 24 and 26 have respective conventional hydraulic actuated brakes 32 and 34 actuated by manual operation of a conventional master cylinder 36 through a pair of traction control pressure actuators 38 and 40. When the actuators 38 and 40 are inactive, the hydraulic fluid from the master cylinder 36 passes through the actuators 38 and 40 to the brakes 32 and 34 of the wheels 24 and 26. Thus, the actuators 38 and 40 are transparent to the braking system during normal braking of the wheels 24 and 26. Similarly, the rear wheels 28 and 30 include a pair of conventional hydraulic actuated brakes 42 and 44 operated by hydraulic fluid under pressure from the master cylinder 36 in response to manual actuation of the brakes.

The actuators 38 and 40 may take the form of the motor driven pressure actuators as illustrated in the Ghoneim et al U.S. Pat. No. 5,025,882 which issued Jun. 25, 1991 and which is assigned to the assignee of this invention. The contents of this patent are hereby incorporated by reference.

If the vehicle engine is operated so as to deliver excessive torque to the driven wheels 24 and 26, they will experience excessive slip relative to the road surface thereby reducing the tractive force and the lateral stability of the vehicle. In order to limit the acceleration slip of the driven wheels 10 and 12 resulting from excessive engine output torque, a controller 46 provides for operation of the brakes 32 and 34 of the wheels 24 and 26 via the actuators 38 and 40. To sense the slip condition of the driven wheels, the controller 46 monitors the wheel speeds of the left and right driven wheels 24 and 26 via speed sensors 48 and 50 and the wheel speeds of the left and right undriven wheels 28 and 30 via speed sensors 52 and 54. The speed sensors may take the form of any conventional speed sensor. For example, in one embodiment the speed sensor may be comprised of an exciter ring rotated with the wheels and an electromagnetic sensor which monitors the rotation of the exciter ring to provide a signal having a frequency proportional to wheel speed. The wheel speed signals are provided to the controller 46 to be used to determine the individual wheel speeds.

If the controller 46 detects an excessive slip condition, the actuators 38 and 40 are operated via actuator controllers 56 for braking the left, right or both of the driven wheels 24 and 26 experiencing an excessive slipping condition to limit the slipping condition. The actuator controllers 56 may take the form of two conventional independent motor driver interface (MDI) circuits which function to provide closed loop motor current control at a level commanded by the controller 46. For example, each MDI circuit may take the form as illustrated in the Kelley et al. U.S. Pat. No. 4,924,158 which issued on May 8, 1990.

As will be described, during straight line acceleration, the slip of the wheels 24 and 26 are generally limited at the slip value resulting in a maximum longitudinal tractive force. However and in accord with this invention, during acceleration while negotiating a turn, the slip limit of the wheel on the inside of the turn is further closed loop adjusted to a lower level that establishes the desired turn radius while at the same time enhancing the directional control of the vehicle by increasing the lateral frictional forces on the inner wheel. The desired turning radius is computed based upon the sensed position of a conventional steering wheel 58 as monitored by a position sensor 60.

The controller 46 takes the form of a conventional general purpose digital computer programmed to control the slip of the driven wheels 10 and 12 in accord with the principles of this invention. The controller 46 consists of a common digital computer that includes a read only memory (ROM), a random access memory (RAM), an analog-to-digital converter (A/D) that converts the analog output of the position sensor 60 to a digital signal, a power supply device, a central processing unit and an input-output section which interfaces to the actuator controllers 56 and the individual wheel speed sensors 48–54. The computer may, in one embodiment, may take the form of the Motorola single chip microcomputer MC68HC11.

Figure 4:
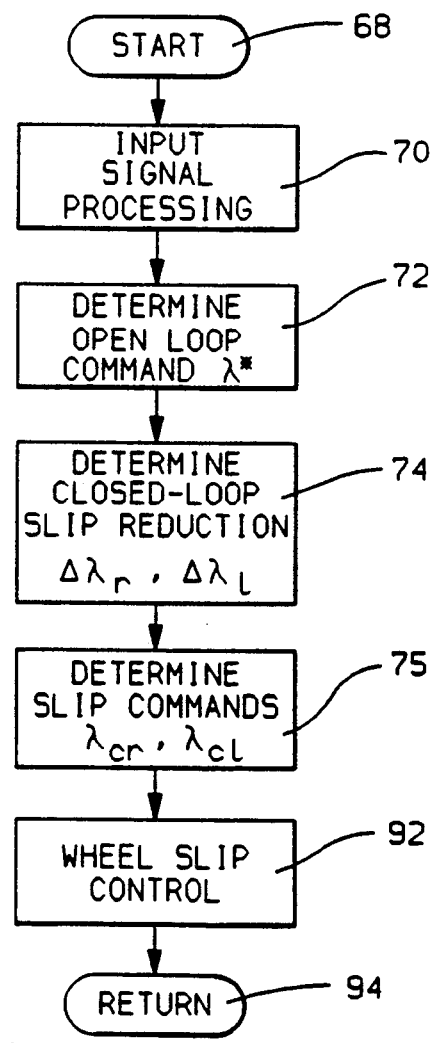
Figure 5:
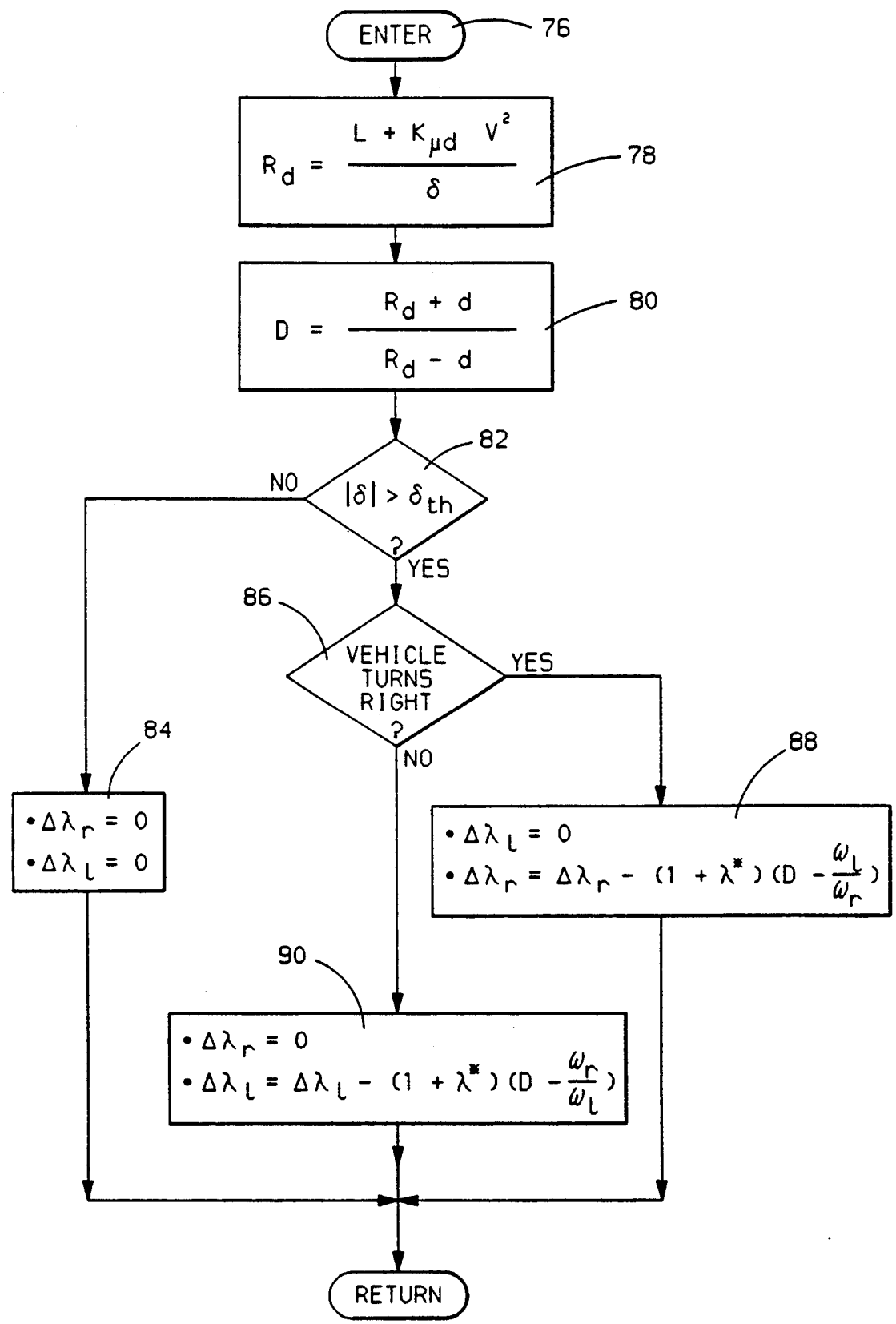
Figure 6:
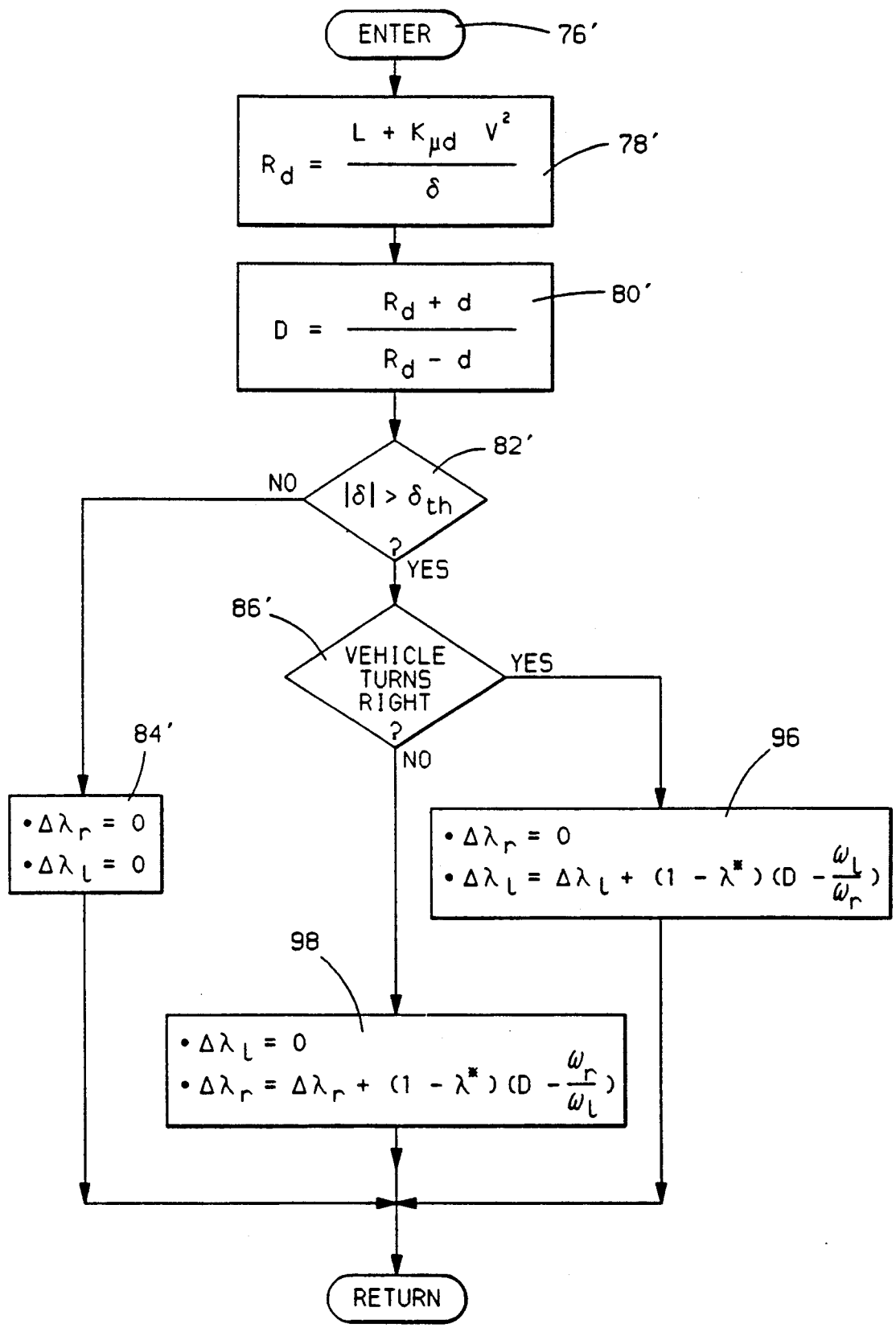
FIG. 6 is a flow diagram illustrating the invention as applied to an anti-lock brake control system of a vehicle.

The ROM of the digital computer of FIG. 2 contains the instructions necessary to implement the control algorithm as diagrammed in the FIGS. 4–6 in addition to calibration constants utilized in controlling acceleration slip. The flow diagram function blocks of FIGS. 4–6 each describes the general task or process being executed by the controller 46 at that point. A specific programming of the ROM for carrying out the functions depicted in the flow diagrams may be accomplished by standard skill in the art using conventional information processing languages.

Figure 3:
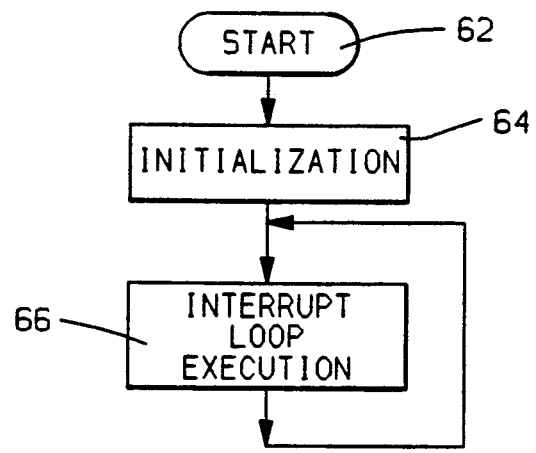
FIGS. 3-5 are flow diagrams illustrating the operation of the traction controller of FIG. 1.

Referring to FIG. 3, the control program implemented by the computer is powered up and initialized at steps 62 and 64 when the vehicle operator actuates the vehicle ignition key. During execution of the initialization routine 64, various parameters are initialized including counters, flags and pointers. Additionally, the necessary start up sequences for operation of the computer, which are well known to those skilled in the art, are performed. After initialization, the computer enters the control loop 66 to repeatedly execute the algorithms at a predetermined interrupt interval such as 10 milliseconds.

Referring to FIG. 4, the computer enters the interrupt routine at step 68 and at step 70 determines the value of the various parameters including the steering angle $\delta$ as represented by the output of sensor 60 and the individual wheel speeds represented by the outputs of the speed sensors 48–54. At step 72, the routine determines an open loop command slip value $\lambda^*$. In this embodiment, wheel slip for traction control is based on the expression $$(-\omega + V)/\omega, \tag{1}$$

where $\omega$ is wheel speed and $V$ is vehicle speed. As can be seen, this value will be negative while the wheel is slipping with an absolute magnitude less than unity. In the preferred form, the open loop slip command value $\lambda^*$ is the wheel slip corresponding to the maximum longitudinal acceleration. In other words, it is the slip value that results in the maximum adhesion between the wheel and the road surface thereby providing maximum longitudinal acceleration of the vehicle. This slip value may be determined such as described in the Ghoneim U.S. Pat. No. 4,947,332 which issued Aug. 7, 1990, the contents of which are hereby incorporated by reference. Alternatively, the open loop command slip value may be a calibration value stored in memory representing a maximum slip value allowed between the wheels and the road surface.

The next steps 74 and 75 provide for the determination of closed loop acceleration slip commands. In general, when the vehicle is cornering, the traction control slip command for the wheel on the inside of the turn is close loop adjusted from the open loop $\lambda^*$ determined at step 72 so that during traction controlled acceleration while the vehicle is turning, the vehicle turn radius is established at the desired turn radius $R_d$ dictated by the operator steering input and a desired understeer coefficient. First at step 74, a closed loop slip adjustment amount $\Delta\lambda_r$, $\Delta\lambda_l$ for the left and right front wheels 24 and 26, providing for the closed loop adjustment of the slip command of the inner wheel while the vehicle is turning are determined.

The preferred implementation of the step 74 for determining the closed loop slip reduction amount is illustrated in FIG. 5. Referring to this figure, the routine starts at step 76 and proceeds to step 78 where the desired turning radius, $R_d$ is determined according to the expression $$R_d = (L + K_{ud}V^2)/\delta, \tag{2}$$

where V is the vehicle velocity, $K_{ud}$ is the desired understeer coefficient, L is the distance between the front and rear wheels of the vehicle, and $\delta$ is the steering angle of the wheels. The value of $\delta$ is represented by the steering wheel angle signal provided by the sensor 60 and the vehicle velocity V may be determined by an average of the speeds of the left and right rear undriven wheels 28 and 30.

Step 80 then determines the desired wheel speed ratio, D, required to establish the desired turning radio $R_d$ computed at step 78. The desired wheel speed ratio is determined by the expression $$D = (R_d + d)/(R_d - d). \tag{3}$$

Step 82 then determines whether the absolute value (magnitude) of the steering wheel angle, $\delta$, is greater than a threshold value, $\delta_{th}$, such as 5 degrees. If the steering wheel angle $\delta$ is not greater than the threshold value $\delta_{th}$, no understeer correction is applied. Correspondingly, the closed loop slip adjustment values $\Delta\lambda_r$ and $\Delta\lambda_l$ are set to zero at step 84 resulting in the wheel slip limit values for each of the wheels being set to the open loop value $\lambda^*$.

If the steering wheel angle $\delta$ is greater than $\delta_{th}$, step 86 tests to determine if the vehicle is turning left or right. The right turn/left turn test is easily implemented. For example, if the steering wheel angle sensor 60 is a potentiometer, the right turn/left turn determination at step 86 is simply a function of whether the signal output of the sensor 60 is greater than or less than the reference signal that occurs when the steering wheel is centered (zero degree turn). This is just one example implementation and other implementations for other types of sensors are easily accomplished by those skilled in the art.

If the output of the steering wheel angle sensor 60 indicates that the vehicle is turning right such that the right wheel is the inside wheel, the routine proceeds to a step 88 where the closed loop adjustment $\Delta\lambda_l$ for the left wheel on the outside of the turn is reset to zero. As indicated, in traction control, the close loop slip command adjustment is made to the wheel on the inside of the turn which functions not only to establish the vehicle turn radius at the desired value but also to decrease the magnitude of the slip on the wheel on the inside of the turn to increase the lateral force exerted on the wheel to enhance vehicle cornering stability. Accordingly, the step 88 determines the closed loop adjustment amount $\Delta\lambda_r$ for the right wheel on the inside of the turn in accord with the expression $$\Delta\lambda_r = \Delta\lambda_r - (1+\lambda^*)(D - (\omega_l/\omega_r)), \tag{4}$$

where $\omega_l$ is the speed of the left front wheel 24 and $\omega_r$ is the speed of the right front wheel 26. The expression $D - (\omega_l/\omega_r)$ represents the error in the speed ratio of the wheels 24 and 26 relative to the desired speed ratio D required to establish the desired turning radius $R_d$ dictated by the vehicle steering angle and the desired understeer coefficient $K_{ud}$. As can be seen from the foregoing expression, the slip adjustment $\Delta\lambda_r$ is a negative value with an absolute magnitude that is increased with each iteration of the routine of FIG. 5 by an amount proportional to the magnitude of the speed ratio error. Accordingly, the closed loop adjustment value $\Delta\lambda_r$ is held constant when the actual speed ratio $\omega_l/\omega_r$ is at the desired ratio D.

If the signal output of the steering angle sensor signal indicates that the vehicle is turning left, the program proceeds to step 90 where the close loop slip adjust $\Delta\lambda_r$ the right wheel on the outside of the turn is reset to zero. The close loop slip adjustment for the left wheel on the inside of the turn is determined according to the expression:

$$\Delta\lambda_l = \Delta\lambda_l - (1+\lambda^*)(D - (\omega_r/\omega_l)). \tag{5}$$

As with the slip adjustment described relative to step 88, the close loop slip adjustment $\Delta\lambda_l$ for the wheel on the inside of the turn when the vehicle is turning left is a negative value with an absolute magnitude that is increased with each iteration of the routine of FIG. 5 by an amount proportional to the magnitude of the speed ratio error.

Returning to FIG. 4, the routine then determines the resulting slip commands $\lambda_{cr}$ for the right wheel 26 and $\lambda_{cl}$ for the left wheel 24 at step 75 in accord with the expressions $$\lambda_{cr} = \lambda^* - \Delta\lambda_r \text{ and} \tag{6}$$

$$\lambda_{cl} = \lambda^* - \Delta\lambda_l. \tag{7}$$

Since $\lambda^*$, $\Delta\lambda_r$ and $\Delta\lambda_l$ are each negative, the slip magnitude command of the wheel on the inside of the turn is decreased by the expressions (6) and (7). Thereafter at step 92 the routine executes a wheel slip control routine which functions to limit the acceleration slip of the vehicle driven wheels in accord with the determined slip commands of step 75. The slip control routine may take the form of the acceleration slip control routine for a driven wheel brakes as set forth in the Ghoneim et al. U.S. Pat. No. 5,025,882 issued Jun. 25, 1991 the contents of which are hereby incorporated by reference. At step 94, the program returns from the interrupt loop.

Through repeated iterations of the routine of FIG. 4, during acceleration slip control the ratio of the speeds of the wheels 24 and 26 are adjusted by the close loop adjustment of the peak slip value so as to establish the turn radius at the desired radius resulting in the desired understeer coefficient $K_{ud}$. Further, since the resulting slip command for the wheel on the inside of the turn is decreased from the open loop command slip value $\lambda^*$, the lateral force on the wheel on the inside of the turn is increased to enhance the vehicle stability during the turn.

The application of the invention to anti-lock brake control is similar to that described above for traction control systems. However, wheel slip is based on the expression $$(V-\omega)/V. \tag{8}$$

This value is always positive while the wheel is slipping during braking with a magnitude less than unity. Accordingly, the determined open loop slip command value $\lambda^*$ determined at step 72 is always positive with a magnitude less than or equal to unity. Further, for anti-lock controlled braking the slip command $\lambda_{cr}$ or $\lambda_{cl}$ determined at step 75 for the wheel on the outside of the turn is reduced by an amount increasing the outside wheel speed to establish the turning radius at the desired radius establishing the desired understeer coefficient. The reduction of the slip command for the wheel on the outside of the curve further functions to increase the lateral force operating on the wheel on the outside of the curve thereby enhancing cornering ability.

The routine 74 for determining the closed loop slip reduction $\Delta\lambda_r$ and $\Delta\lambda_l$ in the case of an anti-lock brake controller is illustrated in FIG. 6. The steps 76'-86' are identical to the corresponding steps of FIG. 5 as applied to traction control. However, when step 86' determines the vehicle is in a right turn, a step 96 resets the closed loop slip reduction value $\Delta\lambda_r$ for the right wheel on the inside of the turn to zero and computes the closed loop slip reduction value $\Delta\lambda_l$ for the wheel on the outside of the turn in accord with the expression $$\Delta\lambda_l = \Delta\lambda_l + (1-\lambda^*)(D-(\omega_l/\omega_r)). \tag{9}$$

This value is adjusted with each iteration of the routine of FIG. 6 in accord with the error between the desired wheel speed ratio and the actual wheel speed ratio. Further, the value of $\Delta\lambda_l$ is positive resulting in step 75 reducing the slip command $\lambda_{cl}$ to the left wheel on the outside of the turn from the open loop command $\lambda^*$ until the slip of the left wheel on the outside of the turn has been reduced by an amount reducing the speed ratio error to zero resulting in the desired turning radius and understeer.

Conversely, if step 86' determines the vehicle is turning left, step 98 resets the closed loop slip reduction command $\Delta\lambda_l$ and adjusts the closed loop slip reduction command value $\Delta\lambda_r$ by an amount determined by the expression $$\Delta\lambda_r = \Delta\lambda_r + (1-\lambda^*)(D-(\omega_l/\omega_r)) \tag{10}$$

resulting in the slip command established at step 75 reducing the slip command $\lambda_{cr}$ for the right wheel on the outside of the turn from the open loop command $\lambda^*$ to establish the desired turning radius and understeer.

The foregoing description of a preferred embodiment for the purpose of describing the invention is not to be considered as limiting the invention since many modifications may be made by the exercise of skill in the art without departing from the scope of the invention.

The embodiments of the invention in which an exclusive property or privilege is claimed are defined as follows:

1. A wheel slip control system for controlling the slip of a left wheel and a right wheel of an axle of a vehicle having a steering wheel positionable by a vehicle operator, the system comprising:

means for measuring a steering angle of the steering wheel and supplying a steering angle signal as an indication of the steering angle;

means for measuring right and left wheel speeds and supplying wheel speed signals $\omega_r$ and $\omega_l$ as indications of said right and left wheel speeds, respectively;

means for determining a desired turning radius $R_d$ in response to the steering angle signal;

means for determining a desired ratio D of the left and right wheel speeds to establish the desired turning radius $R_d$;

means for comparing the desired ratio of the left and right wheel speeds and an actual ratio of the left and right wheel speeds indicated by the wheel speed signals $\omega_r$ and $\omega_l$; and means for controlling wheel slip, the means for controlling wheel slip including:

means for determining an open loop wheel slip limit value and means for limiting the wheel slip of the left and right wheels by (A) limiting the slip of one of the right and left wheels at the open loop wheel slip limit and (B) limiting the slip of the other one of the left and right wheels at a slip limit at which the actual ratio of the left and right wheel speeds is equal to the desired ratio.

2. A wheel slip control system for controlling the slip of a left wheel and a right wheel of an axle of a vehicle having a steering wheel positionable by a vehicle operator, the system comprising:

means for measuring a steering angle of the steering wheel and supplying a steering angle signal as an indication of the steering angle $\delta$;

means for measuring right and left wheel speeds and supplying wheel speed signals $\omega_r$ and $\omega_l$ as indications of said right and left wheel speeds, respectively;

means for determining vehicle speed V;

means for determining a desired turning radius $R_d$ as a predetermined function of the steering angle $\delta$, the vehicle speed V and a desired understeer coefficient $K_{ud}$;

means for determining a desired ratio D of the left and right wheel speeds to establish the desired turning radius $R_d$;

means for comparing the desired ratio D and a ratio $\omega_l/\omega_r$; and means for controlling wheel slip, the means for controlling wheel slip including means for limiting the wheel slip of the left and right wheels by (A) limiting the slip of one of the right and left wheels at an open loop wheel slip limit value $\lambda^*$ and (B) limiting the slip of the other one of the left and right wheels at a lower slip limit value at which the ratio $\omega_l/\omega_r$ is equal to the ratio D.

3. The system of claim 2 wherein the desired ratio D is equal to $(R_d+d)/(R_d-d)$, where d is one half of the distance between the right and left wheels.

4. The system of claim 2 further including means for determining a vehicle turning condition, and wherein:

the left and right wheels are driven by a vehicle engine for propelling the vehicle, the means for controlling wheel slip comprises a traction control means for limiting wheel slip during vehicle acceleration, when the determined vehicle turning condition is a left turn, the one of the right and left wheels limited at the open loop wheel slip limit value $\lambda^*$ is the right wheel and the one of the right and left wheels limited at the lower slip limit is the left wheel, and when the determined vehicle turning condition is a right turn, the one of the right and left wheels limited to the open loop wheel slip limit value $\lambda^*$ is the left wheel and the one of the right and left wheels limited at the lower slip limit is the right wheel.

5. The system of claim 2 further including:

means for determining a vehicle turning condition and a respective operator actuated brake for each of the right and left wheels for braking the vehicle, and wherein:

the means for controlling wheel slip comprises an anti-lock brake control means for limiting wheel slip during vehicle braking, when the determined vehicle turning condition is a left turn, the one of the right and left wheels limited at the open loop wheel slip limit value $\lambda^*$ is the left wheel and the one of the right and left wheels limited at the lower slip limit is the right wheel, and when the determined vehicle turning condition is a right turn, the one of the right and left wheels limited at the open loop wheel slip limit value $\lambda^*$ is the right wheel and the one of the right and left wheels limited at the lower slip limit is the left wheel.

* * * * *